(No Model.) 2 Sheets—Sheet 1.
G. E. PATRICK.
APPARATUS FOR EXTRACTING SUGAR FROM SACCHARINE MATERIALS.
No. 449,747. Patented Apr. 7, 1891.
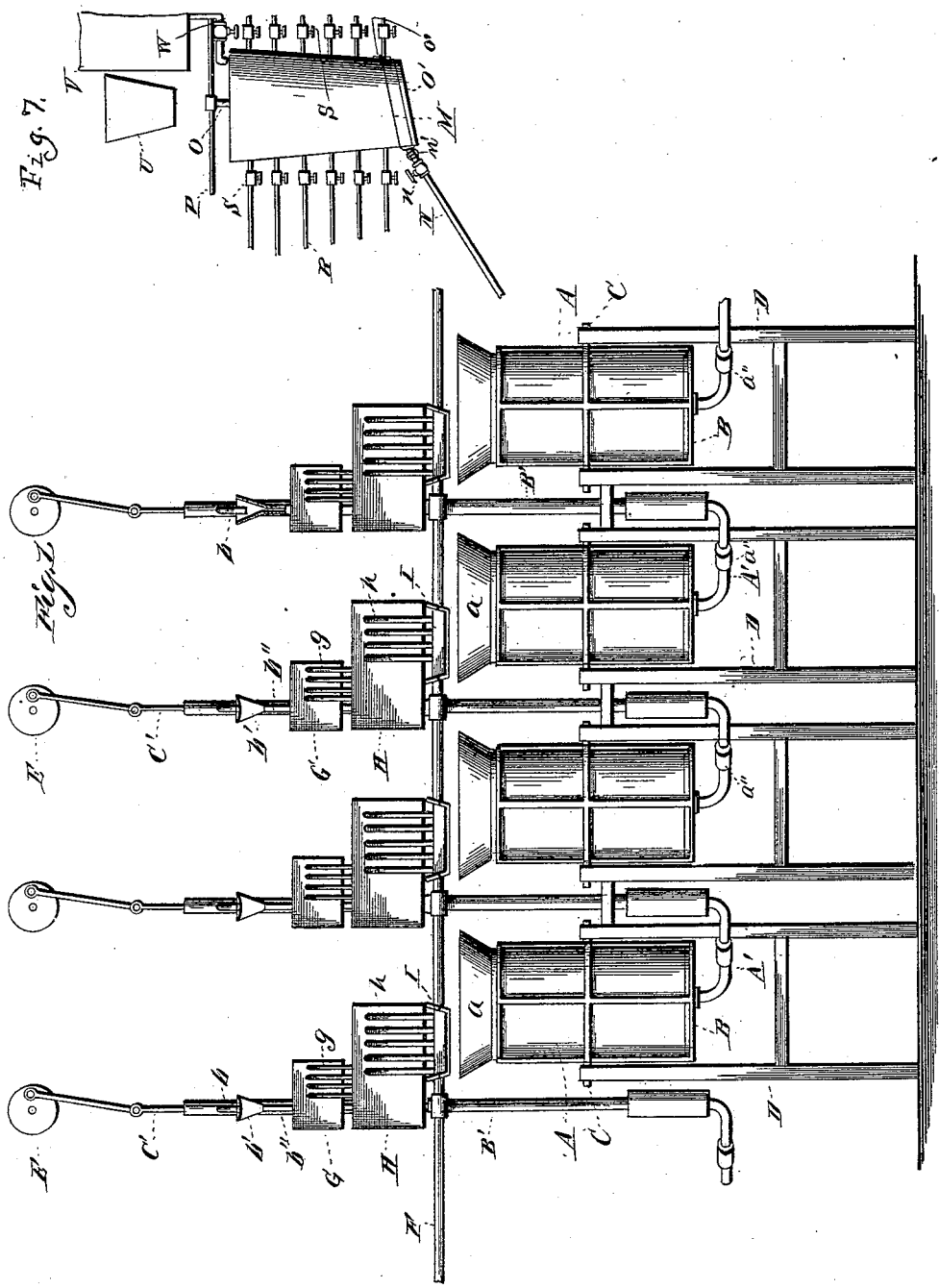
Witnesses:
Chas. L. Taylor
R. A. Balderson
Inventor:
Geo. E. Patrick.
By his Attys.
Higdon & Higdon

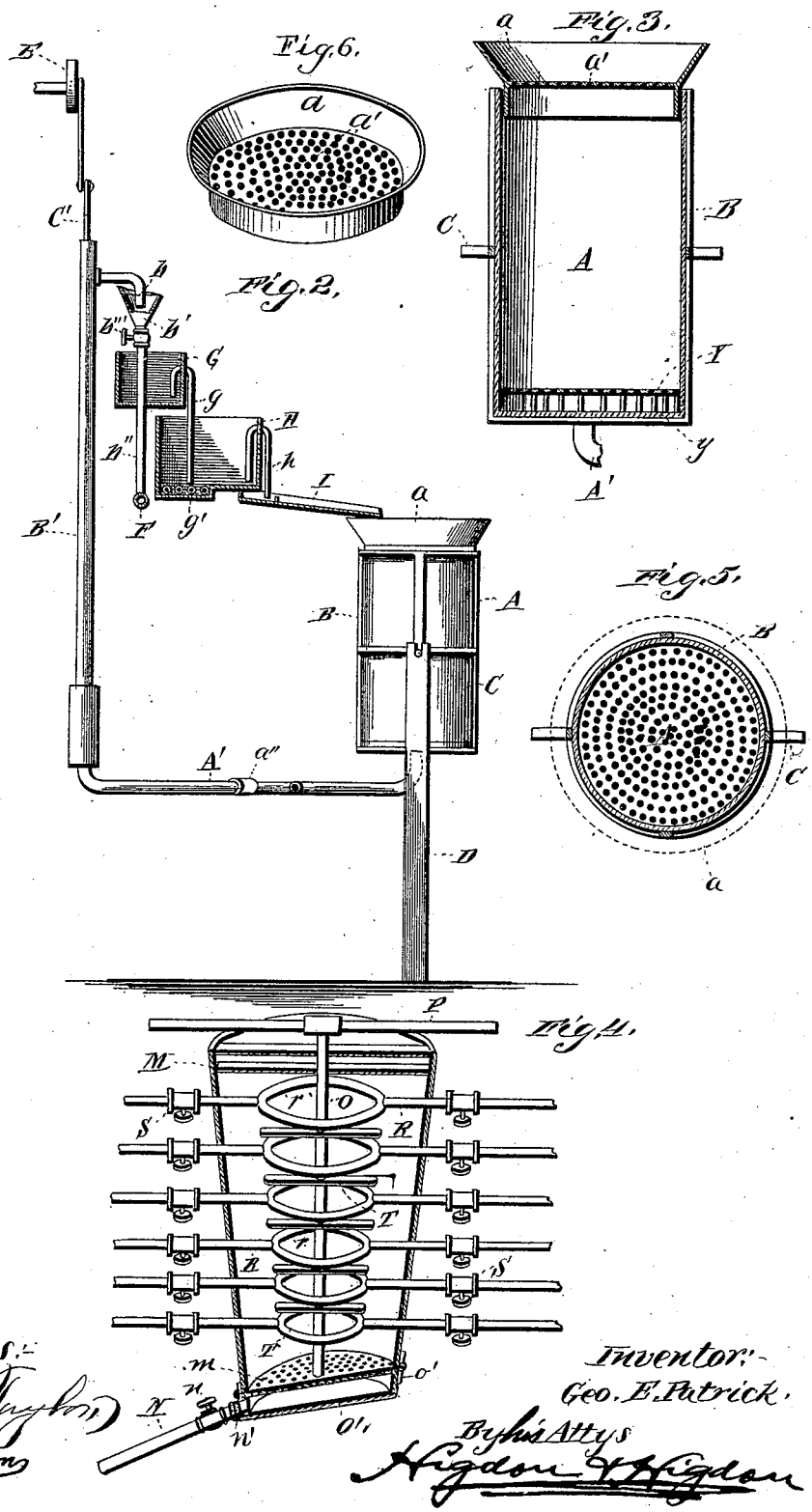

UNITED STATES PATENT OFFICE.

GEORGE E. PATRICK, OF AMES, IOWA.

APPARATUS FOR EXTRACTING SUGAR FROM SACCHARINE MATERIALS.

SPECIFICATION forming part of Letters Patent No. 449,747, dated April 7, 1891.

Application filed January 18, 1890. Serial No. 337,401. (No model.)

*To all whom it may concern:*

Be it known that I, GEORGE E. PATRICK, of Ames, Story county, Iowa, have invented certain new and useful Improvements in an Apparatus for Extracting Juice from Sugar-Bearing Materials, of which the following is a full, clear, and exact description, reference being had to the accompanying drawings, forming a part hereof.

My invention relates to improvements in the process of and apparatus for extracting juice from sugar-bearing materials, such as sugar-cane, sorghum, sugar-beets, &c.; and it consists in the novel construction and arrangement hereinafter set forth and described.

In the drawings which illustrate the manner of carrying out my invention, Figure 1 is a side view of my device, showing four of the diffusion or extracting cells in position. Fig. 2 is a vertical section of the tanks G and H and chute I. Fig. 3 is a central vertical section taken through cell A, with the perforated distributing-funnel $a$ above it as in use. Fig. 4 is a sectional perspective view of the heating-cell M. Fig. 5 is a cross-sectional view of the perforated distributing-funnel $a$ in place on the cell A. Fig. 6 is a detail perspective view of the perforated distributing-funnel $a$. Fig. 7 is a side elevation of the heating-cell M.

Referring to the drawings by letter, A represents a diffusion or extracting cell made of any suitable material, and, if necessary for strength, supported and inclosed by metallic bands B, there being a series of these cells, each cell being provided centrally with horizonal pivots C, by which it is supported on suitable supports D, and by means of which it can be inverted in order to discharge the contents. Of these diffusion or extracting cells there may be any number from one upward.

$a$ is a movable funnel having perforated bottom $a'$, and when in position above the cells A it distributes the juice or water conducted to it by chute I evenly over the sugar-bearing material in the cell.

A' is the pipe provided with the coupling $a''$, through which the juice is drawn from cells A by means of a suitable pump B'. This pump may be a vacuum or any other form of suction or suction and lifting pump. Said pump may be operated by any preferred means. In the drawings it is shown as operated by the drive-wheel E, which is connected to the suction-rod C'.

$b$ is the pipe through which the water or juice passes into hopper $b'$. This juice overflows into tank G, from which when it reaches a certain level it is drawn by the siphons $g$ and conducted to the lower tank H, said tank H being provided with heating-pipes $g'$, which keep the liquid thoroughly heated. The water or juice is in a similar manner carried by siphons $h$ from tank H to the chute I, which delivers it into the distributing-funnel $a$, through the perforated bottom of which it falls evenly upon the material in the cell A. In this way the liquid is conducted from cell to cell until it has passed through a sufficient number of cells to have attained the desired strength. $b'''$ is a valve which may be opened when the juice has become strong enough, (from passing through the cells,) thus allowing it to pass down the conducting-pipe $b''$ to the juice-pipe F, and from thence to a suitable settling-tank.

The water with which to effect the extraction or diffusion may be delivered by suitable service-pipes either into the distributing-funnel $a$ or into one of the tanks G or H, as preferred.

Y is a perforated false bottom in cells A, supported on suitable pins $y$. This perforated bottom serves to drain the chips and allows the juice only to pass into the drawing-off pipe A' and up through the pump B'.

When it is desired to tip the cells A for the purpose of pouring out the exhausted material after the extraction is completed, I remove the coupling $a''$ on pipe A and the funnel $a$.

It is evident that this mode of effecting diffusion or extraction, as thus far described, has the defect, as compared with the method in common use, of not treating the sugar-bearing material in a newly-filled diffusion-cell (the one at the end of the series if a number of cells be used) with heated water or juice in quantity sufficient at the first treatment or percolation to heat more than a small part of the sugar-bearing material to the temperature readily attained throughout the entire contents of the cell of a diffusion-battery as at present operated—namely, to a temperature of from 120 to 190° Fahrenheit—which elevated temperature is essential to the securing of a juice fairly free from those vegetable matters which are rendered insoluble by heat alone or by heat and certain so-called "defecating agents," which are commonly added to the contents of the diffusion-cell. Therefore to attain the same results by my method that are attained by the method at present in use, I am obliged to heat the cane chips or other sugar-bearing materials previous to their introduction into the diffusion or extracting cells. This I do in the heating-cell M, in which the sugar-bearing materials are placed, together with either water or previously-extracted juice, and heated with or without the addition of a defecating agent to either water, juice, or sugar-bearing materials.

The heating-cell M is shown in Figs. 4 and 7. The cane chips or other sugar-bearing materials are fed into the cell by a hopper U, and the water or juice is supplied from supply-tank V by a pipe controlled by valve W. The heating is effected by steam-pipes R, provided with coils $r$, located within the cells. The door O′ at the base of the heating-cell has a perforated false surface $m$, and from the space between the latter and the solid outer surface (or bottom) a pipe N, provided with a coupling $n'$, conducts away the juice (or liquid) when the heating is finished. This juice may be immediately evaporated or may be used for heating the next charge of chips, or may be run through the diffusion-cells to be further enriched, as may be desired. When the heating in the cell M is finished and the juice has been withdrawn, as described, the coupling $n'$ is uncoupled, the door O′ is swung open, the saccharine material removed, and conveyed by any suitable means to one of the diffusion-cells A, where it is treated in the manner already described.

To facilitate the removal of the heated sugar-bearing material from the heating-cell M, the latter is provided with a vertical shaft O, to which are rigidly attached agitators T, and also a handle P, by means of which the shaft and agitators are worked back and forth or revolved in either direction. $n$ is a suitable valve on the drawing-off pipe N, leading from heating-cell M.

Having thus fully described my invention, what I claim as being new, and desire to secure by Letters Patent, is—

1. In an apparatus for extracting juice from sugar-bearing materials, the diffusion-cells, pumps for drawing the liquid from said cells, pipes $a'$, connecting said pumps and cells, receivers $b'$, located under the nozzles of said pumps, a main conducting-pipe F, short pipes $b''$, having stop-cocks therein connecting said receivers and main conducting-pipe, tanks G, into which the liquids from said receivers may flow when the cock is closed, siphons $g$, connecting said tanks with heating-tanks, and siphons $h$, leading from said heating-tanks, discharging the liquid therefrom to the next cell, as described.

2. In an apparatus for extracting juice from sugar-bearing materials, as herein described, the heating-cell M, having a hinged bottom, a perforated plate covering the hinged bottom, heat-coils $r$, and agitators T, located within said cell, said agitators being located between the heat-coils, and suitable steam-pipes connected with the heat-coils $r$, substantially as described.

In testimony whereof I affix my signature in presence of two witnesses.

GEORGE E. PATRICK.

Witnesses:
  ALBERT RICHMOND,
  HOWARD P. McLAIN.